(12) United States Patent
Shekalim

(10) Patent No.: US 6,213,408 B1
(45) Date of Patent: Apr. 10, 2001

(54) FLOW REGULATOR AND CORRESPONDING METHOD WITH PRESSURE RESPONSIVE FLOW REGULATION

(75) Inventor: Avraham Shekalim, Nesher, IL (US)

(73) Assignee: Eureka Technologies LTD, Migdal Haemek (IL)

( * ) Notice: Subject to any disclaimer, the term of this patent is extended or adjusted under 35 U.S.C. 154(b) by 0 days.

(21) Appl. No.: 09/443,114

(22) Filed: Nov. 18, 1999

(51) Int. Cl.[7] .......................................... B05B 15/00
(52) U.S. Cl. .......................... 239/1; 239/542; 239/533.1; 239/547
(58) Field of Search ........................... 239/1, 106, 533.1, 239/533.13, 533.15, 542, 547, 562, 566, 571, 574; 137/504, 855; 138/40, 42, 44

(56) References Cited

U.S. PATENT DOCUMENTS

| | | | |
|---|---|---|---|
| 3,780,946 | * 12/1973 | Smith et al. | 239/542 X |
| 3,807,430 | * 4/1974 | Keller | 137/504 |
| 4,084,749 | 4/1978 | Drori . | |
| 4,502,631 | * 3/1985 | Christen | 239/542 X |
| 4,653,695 | 3/1987 | Eckstein . | |
| 5,183,208 | 2/1993 | Cohen . | |
| 5,400,973 | 3/1995 | Cohen . | |
| 5,609,303 | 3/1997 | Cohen . | |
| 5,615,838 | * 4/1997 | Eckstein et al. | 239/533.1 |
| 5,829,685 | 11/1998 | Cohen . | |

* cited by examiner

Primary Examiner—David A. Scherbel
Assistant Examiner—Steven J. Ganey
(74) Attorney, Agent, or Firm—Mark M. Friedman

(57) ABSTRACT

A flow regulator for regulating flow of a fluid includes a flow-attenuating labyrinth formed at least in part by a plurality of baffles. At least some of the baffles are implemented as leaf-spring portions, preferably made from metallic material, which are deployed so as to be free to flex in response to variations in a pressure exerted on the leaf-spring portion by the fluid. The leaf-spring portions are configured to cooperate with an adjacent surface to provide multiple-stage pressure-responsive flow regulation.

16 Claims, 5 Drawing Sheets

FLOW REGULATOR AND CORRESPONDING METHOD WITH PRESSURE RESPONSIVE FLOW REGULATION

FIELD AND BACKGROUND OF THE INVENTION

The present invention relates to fluid flow regulators and, in particular, it concerns flow regulators based on the principles of labyrinth flow-attenuation devices such as are used in irrigation applications.

Various types of flow attenuators and flow regulators are known for achieving slow release of a fluid from a relatively high pressure source, such as is required for drip irrigation emitters. The most common of these, referred to here as "labyrinth-type devices", achieve flow attenuation by providing a circuitous flow path along which kinetic energy is dissipated through turbulence.

Labyrinth-type devices have been adopted widely in drip irrigation applications for a number of reasons. The use of turbulent flow for flow attenuation allows the size of the passageways to be relatively large, thereby facilitating passage of dirt without blocking the labyrinth. The turbulence itself helps to prevent accumulation of dirt. And the devices may be mass produced from plastic by injection molding at very low cost.

Nevertheless, while labyrinth-type devices offer effective flow attenuation, they fail to provide flow regulation. In other words, the rate of fluid output remains highly dependent upon the supply pressure to the device. This results in uneven irrigation with lower regions and regions closer to the fluid supply often receiving more irrigation than higher regions and regions further from the supply.

To address this problem, a number of pressure-responsive flow regulating devices have been developed. These devices generally employ an elastomeric diaphragm which is exposed on one side to the fluid supply pressure. The other side of the diaphragm faces an outlet chamber having a centrally disposed outlet and which is supplied through a pressure-reducing flow path, typically a small labyrinth. Any increase in the supply pressure flexes the diaphragm so as to reduce the size of the flow path through the outlet, thereby regulating the outlet flow rate.

Flow regulating devices of this type, referred to herein as "diaphragm-type regulators", have been shown to provide substantially constant flow over a considerable range of supply pressures. The use of elastomeric diaphragms, however, is accompanied by various problems. Most notably, the elastomeric materials employed undergo relatively rapid aging such that their elasticity and other mechanical properties may vary significantly over a period of a year or even a few months. Since the low flow rates of drip irrigation require regulation of the outlet clearance on the scale of fractions of a millimeter, even small variations in the elastic properties of the diaphragm may cause pronounced changes in operation of the flow regulator. An additional shortcoming, even in new diaphragm-type regulators, results from the long response time (or "relaxation time") of the elastomeric material, i.e., the time taken to return to its previous shape or to adopt its new shape when the pressure changes suddenly. This time lag may result in significant flow variations at times of sudden variations in supply pressure such as when the fluid supply is switched on or off.

An alternative approach to achieve regulated flow using a labyrinth-type flow attenuator is proposed by U.S. Pat. Nos. 5,400,973, 5,609,303 and 5,829,685 to Cohen. In these devices, an elastomeric membrane is used as a displaceable wall which lies across the top of a set of baffles. The wall is displaced by variations in supply pressure to successively contact more or fewer baffles, thereby varying the operative length of the resulting labyrinth. Here too, the devices suffer from the aforementioned limitations due to aging of the elastomeric materials, and due to the materials' long response times.

A further shortcoming of all devices currently in use which employ a labyrinth for flow attenuation is the inability of the plastic materials used to provide lasting sharp edges. As mentioned earlier, the flow attenuation provided by a labyrinth results primarily from turbulence generated by the baffles. It is well known that turbulence is induced much more effectively by sharp-edged obstructions. However, the plastic materials used for conventional labyrinth devices cannot be produced with highly sharp edges, and they rapidly become further rounded by the effects of the fluid flow during use. The low efficiency of the resulting labyrinths requires the use of greatly extended flow paths to achieve a given degree of attenuation.

There is therefore a need for a flow regulator which would provide substantially constant output over a wide range of input pressures and which would avoid the limitations associated with use of elastomeric materials.

SUMMARY OF THE INVENTION

The present invention is a flow regulator which employs a flow-attenuating labyrinth formed by a plurality of baffles, at least some of the baffles being implemented as leaf-spring portions. This configuration provides a number of advantages. Firstly, each leaf-spring portion is configured to be deflected by the pressure of the inlet-side fluid flow in a manner to provide localized independent fluid flow regulation. By combining a number of similar cells in series, highly effective overall regulation is obtained. According to a preferred feature, the leaf-spring portions are implemented as metallic elements, providing much sharper edges, and thus greater turbulence, than can be achieved in a plastic labyrinth. This allows the use of a much shorter and more compact labyrinth structure.

Thus, according to the teachings of the present invention there is provided, a flow regulator for regulating flow of a fluid, the flow regulator comprising: (a) at least one spring element; and (b) at least one flow-path-defining element configured to provide at least one fixed surface which cooperates with the at least one spring element to define a fluid flow path from an inlet passing through at least one flow regulating cell to an outlet, the at least one flow regulating cell including: (i) a leaf-spring portion provided by the at least one spring element, the leaf-spring portion having a front surface exposed to fluid flowing along the fluid flow path, the leaf-spring portion further providing an edge, the leaf-spring portion being elastically deflectable under pressure applied on the front surface by the fluid from an initial state to a deflected state, and (ii) a clearance surface provided by the at least one flow-path-defining element, the clearance surface defining, together with the edge of the leaf-spring portion, a variable clearance through which the fluid flow path passes, such that the leaf-spring portion is responsive to the pressure of the fluid adjacent to the front surface to vary the clearance, thereby regulating the flow of the fluid.

According to a further feature of the present invention, the at least one flow regulating cell defines a local flow path passing from adjacent to the front surface of the leaf-spring portion around the edge, thereby tending to produce turbulent flow.

According to a further feature of the present invention, the at least one flow regulating cell is configured such that deflection of the leaf-spring portion from the initial state through a predefined normal range of deflection gradually decreases the clearance, while deflection of the leaf-spring portion beyond the normal range of deflection increases a distance of the edge from the clearance surface.

According to a further feature of the present invention, the at least one flow regulating cell is implemented as a series of at least two flow regulating cells deployed sequentially along the fluid flow path.

According to a further feature of the present invention, the at least one spring element is implemented as a generally sheet-like element, the at least one leaf-spring portion being implemented as at least one tongue formed so as to project from the sheet-like element. The generally sheet-like element is preferably formed from metallic material, most preferably from a sheet of spring steel.

There is also provided according to the teachings of the present invention, a flow regulator for regulating flow of a fluid, the flow regulator comprising a flow-attenuating labyrinth formed at least in part by a plurality of baffles, at least one of the baffles being implemented as a leaf-spring deployed so as to be free to flex in response to variations in a pressure exerted on the leaf-spring by the fluid.

According to a further feature of the present invention, at least two of the baffles are implemented as leaf-springs, each of the leaf-springs being free to flex substantially independently of others of the leaf springs.

There is also provided according to the teachings of the present invention, a flow regulator for regulating flow of a fluid, the flow regulator comprising a flow-attenuating labyrinth configured to define a series of at least two indirect flow path legs, wherein at least two of the flow path legs are each configured to provide a pressure-responsive variable flow path geometry wherein a cross-sectional area of at least part of the flow path leg varies as a function of the pressure of the fluid entering the flow path leg.

There is also provided according to the teachings of the present invention, a method for regulating a rate of flow of a fluid, the method comprising providing a flow-attenuating labyrinth configured to define a series of at least two indirect flow path legs, wherein at least two of the flow path legs are each configured to provide a pressure-responsive variable flow path geometry wherein a cross-sectional area of at least part of the flow path leg varies as a function of the pressure of the fluid entering the flow path leg.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
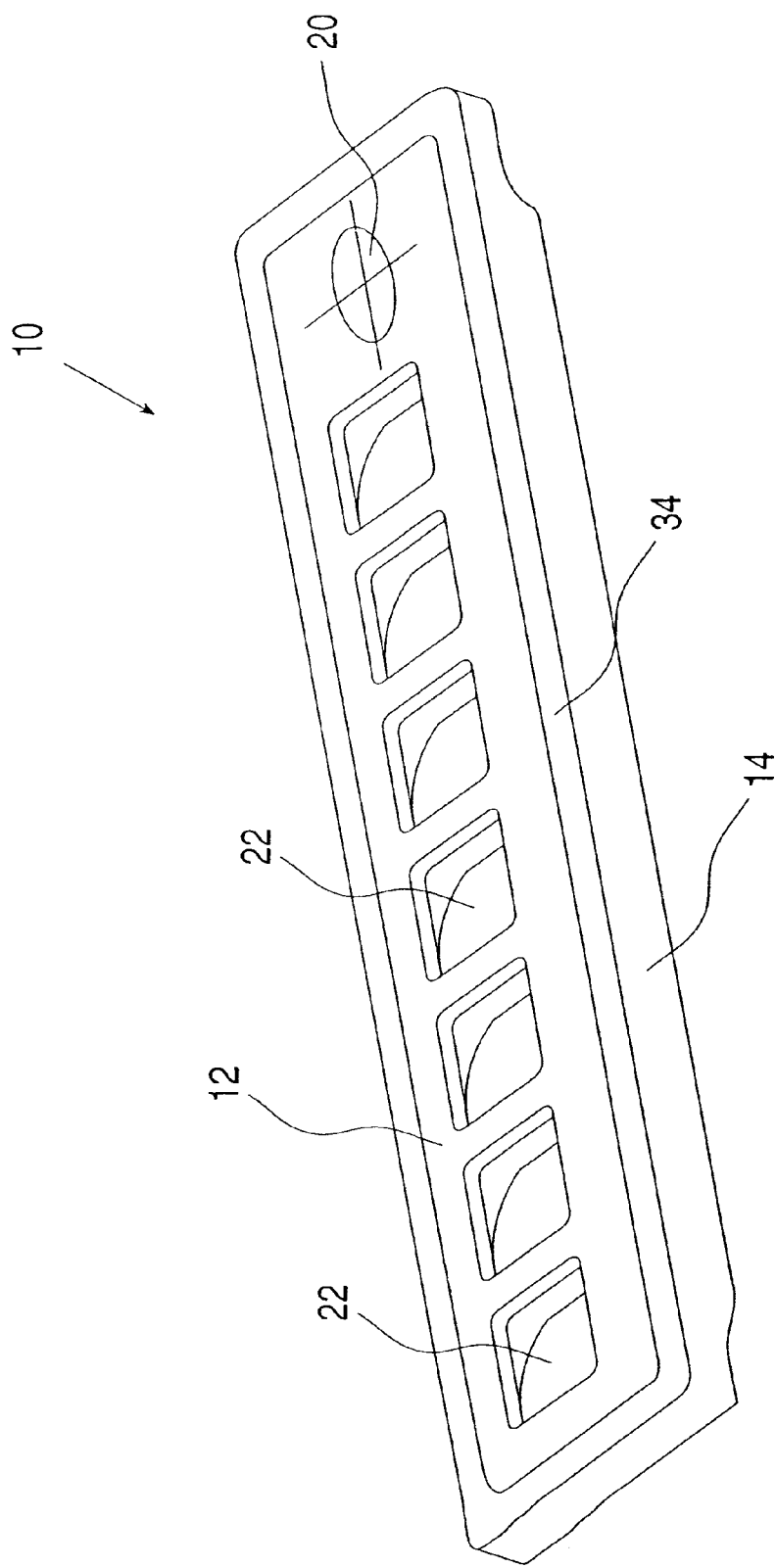
FIG. 1 is a schematic isometric view of a flow regulator, constructed and operative according to the teachings of the present invention, implemented as a drip irrigation emitter.

The present invention is a flow regulator.

The principles and operation of flow regulators according to the present invention may be better understood with reference to the drawings and the accompanying description.

Referring now to the drawings, FIGS. 1–5 show a flow regulator, generally designated 10, constructed and operative according to the teachings of the present invention.

Generally speaking, flow regulator 10 includes at least one spring element 12, and at least one flow-path-defining element 14. Flow-path-defining element 14 is configured to provide a plurality of fixed surfaces which cooperate with spring element 12 to define a fluid flow path from an inlet 16 passing through a number of flow regulating cells 18 to an outlet 20.

Each flow regulating cell 18 includes a leaf-spring portion 22, formed as part of spring element 12. Leaf-spring portion 22 is elastically deflectable under pressure applied on its front surface 24 by fluid flowing along the flow path from an initial unstressed state towards flexed state (represented by 22 and 22', respectively, in FIG. 5). Flow-path-defining element 14 is configured to provide a clearance surface 26 which, together with the edge 28 of leaf-spring portion 22, defined a variable clearance 30 through which the fluid flow path passes. As a result of this structure, leaf-spring portion 22 is responsive to the pressure of fluid adjacent to front surface 24 to vary clearance 30, thereby regulating the flow of the fluid through each flow regulating cell 18.

Thus, flow regulator 10 may be viewed as a flow-attenuating labyrinth where each of leaf-spring portions 22 serves as a flexible baffle, each flow regulating cell 18 defining one of a series of indirect flow path legs together making up the labyrinth. Thus the invention effectively provides a self-adaptive labyrinth in which the flow path legs independently provide a pressure-responsive variable flow path geometry so that the cross-sectional area of part of the flow path leg varies as a function of the pressure of the fluid entering that particular flow path leg.

Figure 2:
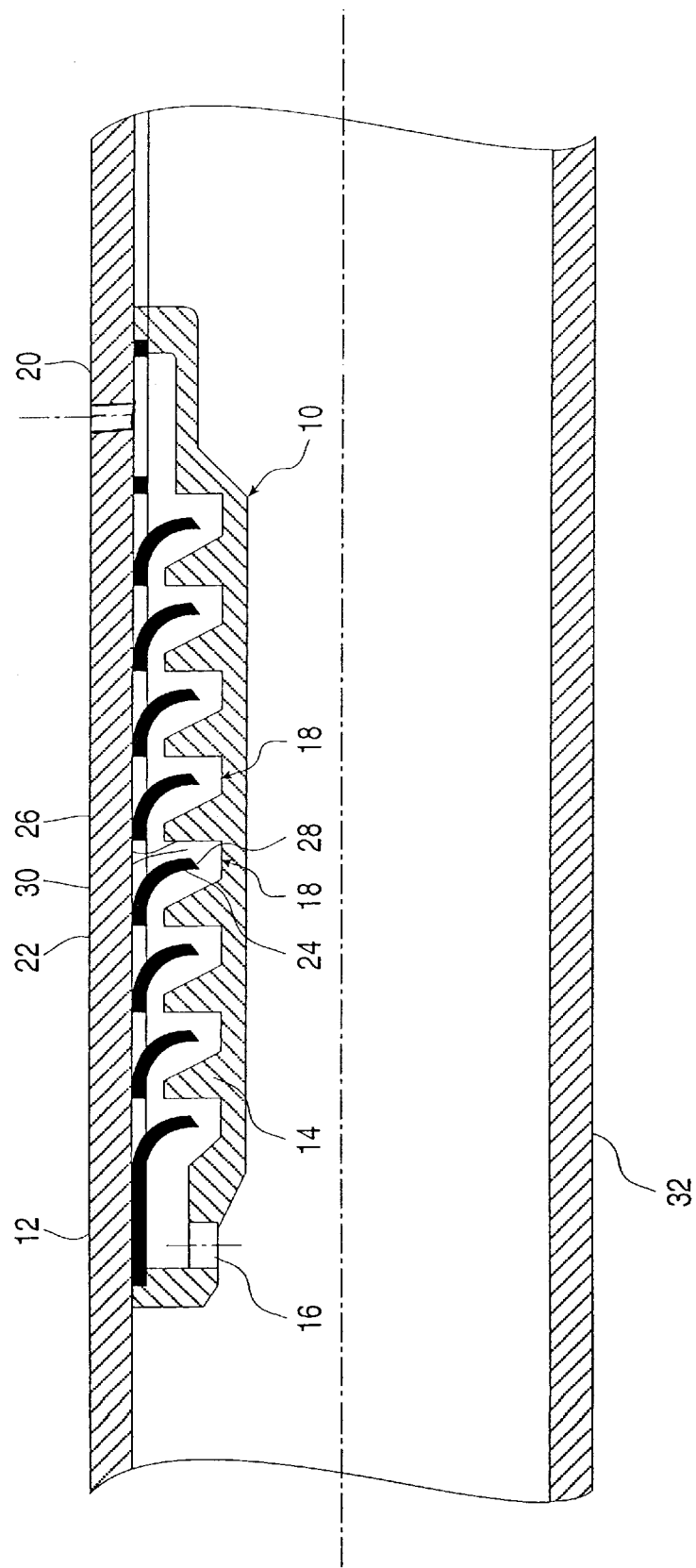
FIG. 2 is a longitudinal cross-sectional view taken through a drip irrigation tube fitted with the flow regulator of FIG. 1.
Figure 3:
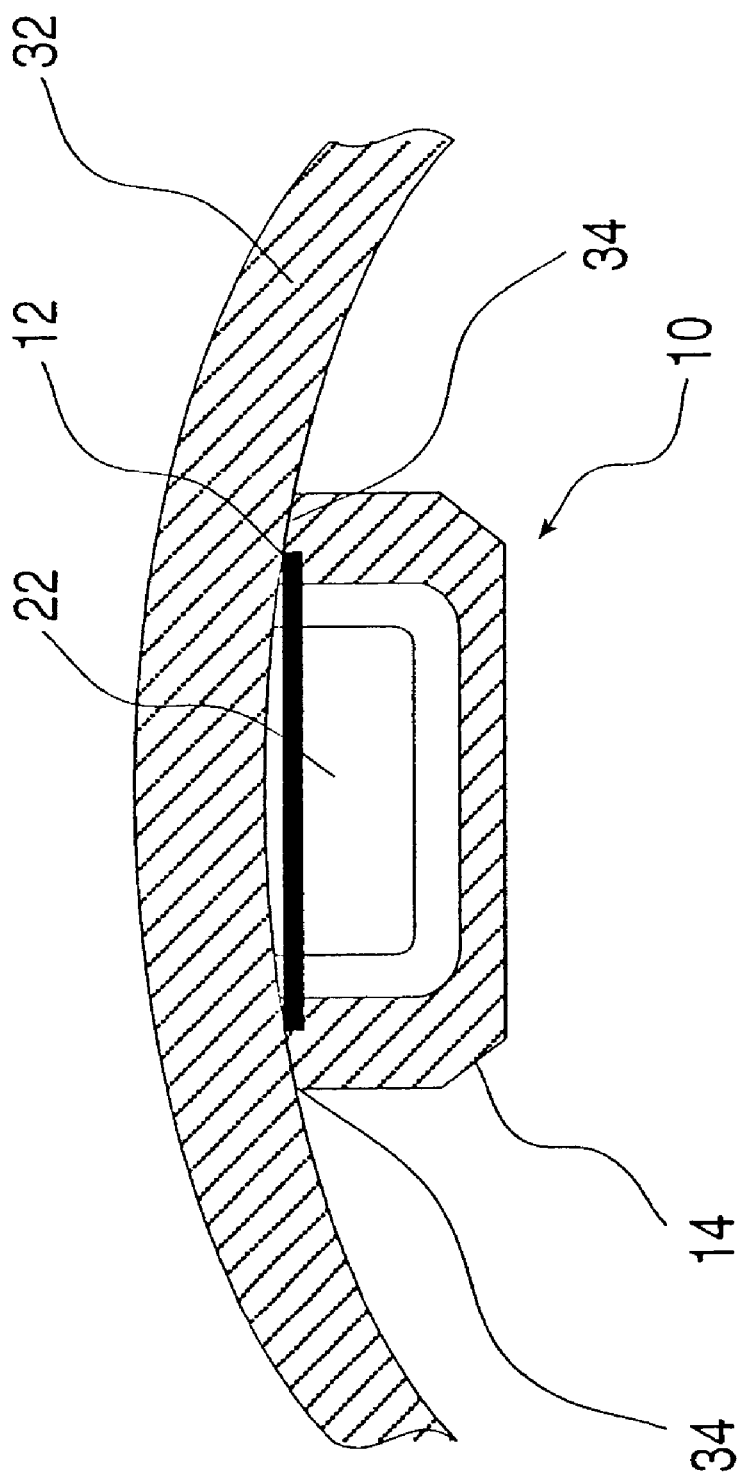
FIG. 3 is a partial transverse cross-sectional view taken through a drip irrigation tube fitted with the flow regulator of FIG. 1.

The present invention is illustrated herein by way of a non-limiting example with respect to an elongated drip irrigation emitter of a form suited for attachment to an internal surface of a drip irrigation tube 32 (FIGS. 2 and 3). It should be noted however that the present invention is readily applicable to other configurations including, but not limited to, cylindrical inserts for insertion within a tube and externally mounted button-type emitters. Thus the positioning and configuration of the inlet and outlet as shown, as well as the in-line geometry of the flow regulating cells 18, is neither necessary nor necessarily preferred. Furthermore, the flow regulators of the present invention may readily be applied to fields other than drip irrigation wherever regulated flow attenuation is required.

Turning now to the features of the present invention in more detail, flow-path-defining element 14 is preferably implemented using a unitary injection-molded plastic body formed with appropriately shaped sockets prepared for each flow regulating cell 18. Each socket has a width, i.e., the horizontal dimension as seen in the view of FIG. 3, sufficient to accommodate the width of the corresponding leaf-spring portion 22 with just sufficient clearance to allow leaf-spring portion 22 to be deflected freely. Further details of the geometry between leaf-spring portion 22 and clearance surface 26 will be discussed below with reference to FIG. 5. Precise details of the shapes and positioning of the other internal surfaces of each socket are generally not critical to the present invention.

Plastic body 14 is also preferably formed with a raised rim 34 which defines a seat within which spring element 12 assumes a predefined defined position. In the example shown here, rim 34 seals directly against the internal surface of tube 32 when they are pressed together after extrusion of the tube such that no additional body components are typically required. In a free-standing flow regulator unit, an additional cover element (not shown) would be required to seal across plastic body 14 after insertion of spring element 12.

Figure 4:
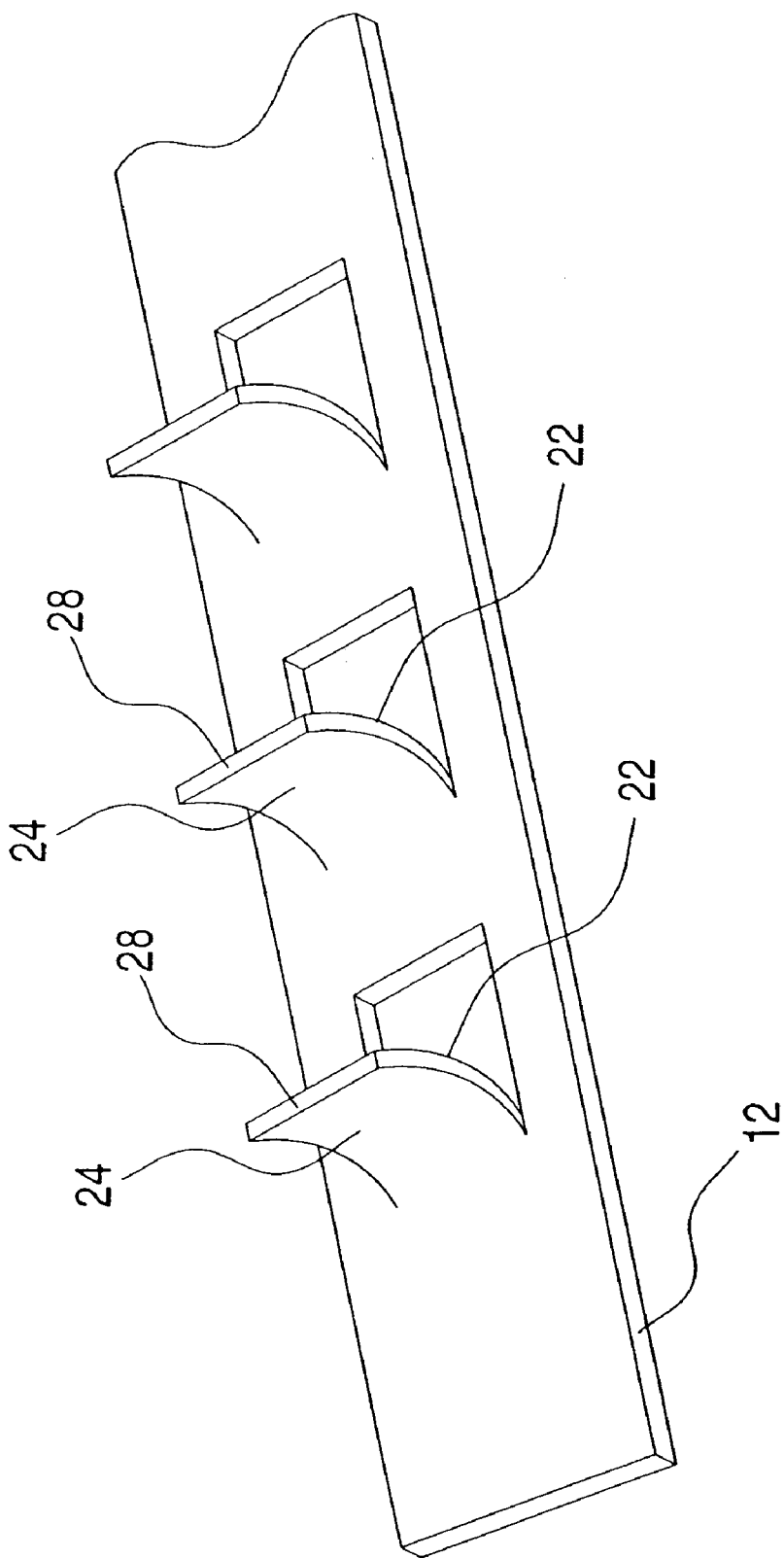
FIG. 4 is a partial schematic isometric view of a leaf-spring element from the flow regulator of FIG. 1.

Turning now to spring element 12, this may be implemented using a range of materials with suitable elastic properties including, but not limited to, metals and metal alloys (referred to collectively herein as "metallic materials") and various polymer materials. Preferably, spring element 12 is formed from a unitary sheet of metal with good spring properties. A preferred example is spring steel such as the steels referred to commercially as stainless steel 301 or stainless steel 302. Suitable sheet thicknesses range from foils of gauge about 0.025 mm up to about 0.5 mm. The leaf-spring portions 22 are preferably implemented by punching through the sheet with an appropriate punching tool to produce tongues of metal connected to the sheet along one side and bent out so as to project from the plane of the sheet (FIG. 4).

As mentioned earlier, leaf-spring portions 22 preferably serve as baffles of a labyrinth configuration. Specifically, each flow regulating cell preferably defines a local flow path passing the front surface 24 of the leaf-spring portion and then abruptly changing direction to pass around edge 28, thereby tending to produce turbulent flow. In contrast to the plastic baffles of conventional labyrinth configurations, the edges of leaf-spring portions 22 such as are formed for example from a metal sheet by the aforementioned punching process are typically highly rectangular, therefore being highly effective to induce turbulence.

It should be noted that, in a most elemental form of the present invention, a possibility of using a single flow regulating cell 18 falls within the scope of the present invention. At the same time, it should be emphasized that preferred implementations of the present invention avoid the very small clearance gaps required by diaphragm-type flow regulators by providing labyrinth-type flow-attenuation. To this end, a series of at least two flow regulating cells 18 is preferably deployed sequentially along the fluid flow path. Typically, at least five, preferably, at least seven, and most preferably at least ten, flow regulating cells are used. It should also be noted that a labyrinth may advantageously be constructed with any number of flow-regulating cells disposed within an otherwise conventional labyrinth, located at its beginning, end, middle, or distributed along its length in any desired positions. Although there is no theoretical upper limit to the number of flow regulating cells which could be used, it should be noted that the greatly enhanced turbulence generated by the sharp-edged leaf-spring portion baffles of preferred implementations of the present invention, together with the regulating action of each cell, renders the labyrinth much more effective than conventional labyrinths of similar dimensions. As a result, it is believed that no more than a maximum of about 30 flow regulating cells 18 are typically required.

It should be noted that flow regulator 10 is shown here schematically to illustrate the principles of the present invention without reference to details particular to specific irrigation system manufacturing techniques. By way of example, in certain applications, a large outlet chamber may be required to accommodate manufacturing tolerances in punching an outlet hole though tube 32. Such details will be readily apparent to one of ordinary skill in the art and are not essential to a full understanding of the structure and operation of the present invention.

Figure 5:
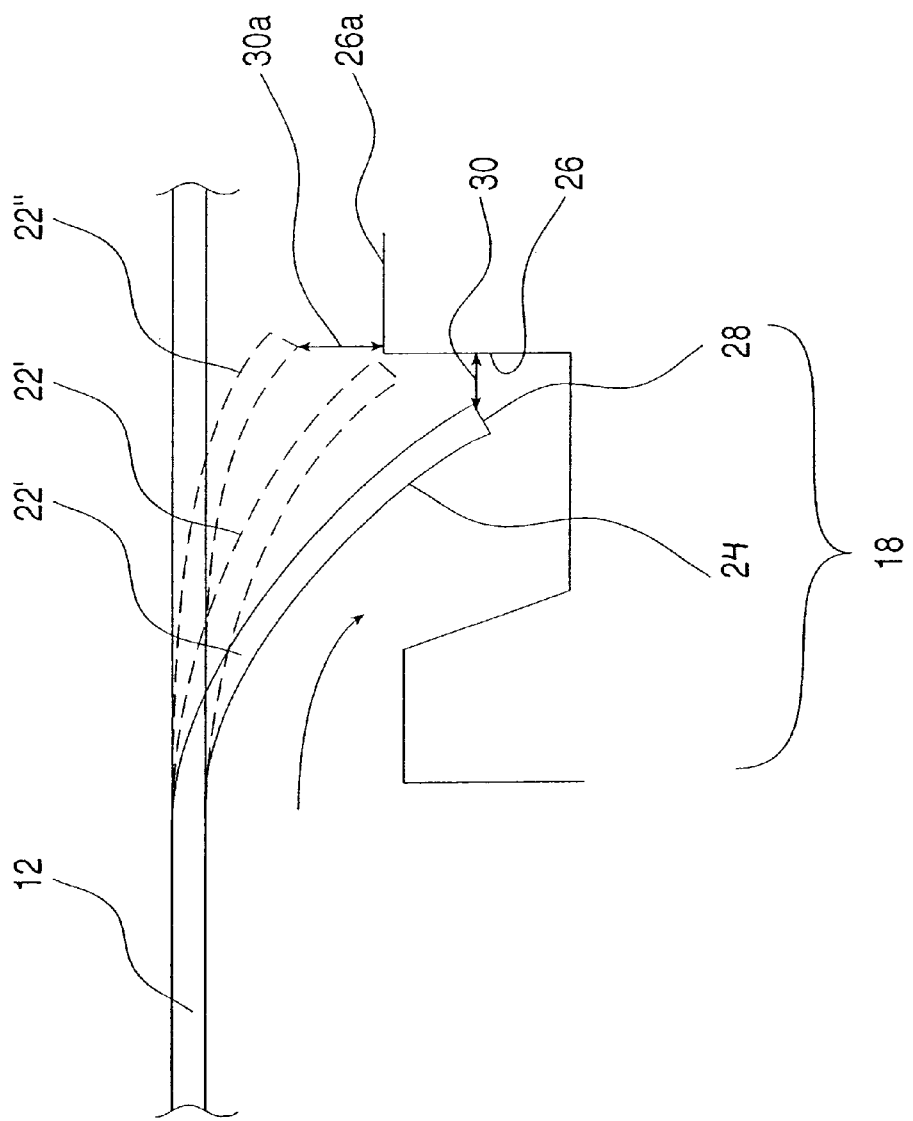
FIG. 5 is an enlarged view of a single flow regulating cell from FIG. 2 illustrating certain principles of operation of the flow regulator of the present invention.

Turning now to the operation of flow regulator 10, this will be best understood with reference to FIGS. 2 and 5. Generally speaking, fluid enters through inlet 16 and passes along the labyrinth flow path defined by successive flow regulating cells 18, losing kinetic energy at each stage through turbulence generated primarily at edge 28 of each cell. At relatively low supply pressures, deflection of leaf-spring portions 22 may be minimal. When the supply pressure increases, the additional pressure acting on surface 24 the leaf-spring portion of at least the first cell 18 causes deflection of the leaf-spring portion, thereby reducing clearance 30 and hence increasing the flow resistance of the cell. The individual cells function independently in response to the fluid pressure reaching them such that, by the end of the series, the fluid pressure converges highly effectively towards a predefined constant flow rate.

It should be noted that the present invention has particular advantages with respect to self cleaning and prevention of blockages. Specifically, the turbulence adjacent to each leaf-spring portion as well as variations in the supply pressure cause frequent if not near-continuous flexural vibration of the leaf-spring portions. This motion alone is thought to be sufficient to prevent accumulation of dirt which would lead to blockage. Optionally, cells 18 may be configured to provide a self-opening clearance feature as will now be described with reference to FIG. 5.

Specifically, as shown in FIG. 5, cell 18 is preferably configured such that deflection of leaf-spring portion 22 from the initial unstressed state through a predefined normal range of deflection up to the position denoted 22' gradually decreases clearance 30. Further deflection of the leaf-spring portion beyond the normal range of deflection such as is shown at 22" starts to again increase the clearance, here labeled 30a, between edge 28 and the facing surface, here labeled 26a, thereby opening up a relatively large passageway to allow any large obstacle to pass through.

It will be noted that, during normal operation, the pressure drop from the supply pressure at inlet 16 to the outlet pressure at outlet 20 is spread across a number of cells 18. As a result, each leaf-spring portion 22 normally remains within the normal range of deflection up to position 22'. However, in the event that one cell 18 becomes blocked, the lack of flow through flow regulator 10 leads to equalization of pressure across all other cells such that the blocked cell becomes exposed to the full pressure difference between the supply pressure and the outlet. The cells are configured such that this pressure difference is sufficient to deflect leaf-spring portion 22 to position 22", thereby allowing the blockage to pass cell by cell through flow regulator 10 until it is released from outlet 20.

It will be appreciated that the above descriptions are intended only to serve as examples, and that many other embodiments are possible within the spirit and the scope of the present invention.

What is claimed is:

1. A flow regulator for regulating flow of a fluid, the flow regulator comprising:

(a) at least one spring element; and
(b) at least one flow-path-defining element configured to provide at least one fixed surface which cooperates with said at least one spring element to define a fluid flow path from an inlet passing through at least one flow regulating cell to an outlet, said at least one flow regulating cell including:
   (i) a leaf-spring portion provided by said at least one spring element, said leaf-spring portion having a front surface exposed to fluid flowing along the fluid flow path, said leaf-spring portion further providing an edge, said leaf-spring portion being elastically deflectable under pressure applied on said front surface by the fluid from an initial state to a deflected state, and
   (ii) a clearance surface provided by said at least one flow-path-defining element, said clearance surface defining, together with said edge of said leaf-spring portion, a variable clearance through which said fluid flow path passes, such that said leaf-spring portion is responsive to the pressure of the fluid adjacent to said front surface to vary said clearance, thereby regulating the flow of the fluid.

2. The flow regulator of claim 1, wherein said at least one flow regulating cell defines a local flow path passing from adjacent to said front surface of said leaf-spring portion around said edge, thereby tending to produce turbulent flow.

3. The flow regulator of claim 1, wherein said at least one flow regulating cell is configured such that deflection of said leaf-spring portion from said initial state through a predefined normal range of deflection gradually decreases said clearance, while deflection of said leaf-spring portion beyond said normal range of deflection increases a distance of said edge from said clearance surface.

4. The flow regulator of claim 1, wherein said at least one flow regulating cell is implemented as a series of at least two flow regulating cells deployed sequentially along said fluid flow path.

5. The flow regulator of claim 1, wherein said at least one spring element is implemented as a generally sheet-like element, said at least one leaf-spring portion being implemented as at least one tongue formed so as to project from said sheet-like element.

6. The flow regulator of claim 5, wherein said generally sheet-like element is formed from metallic material.

7. The flow regulator of claim 5, wherein said generally sheet-like element is formed from a sheet of spring steel.

8. A flow regulator for regulating flow of a fluid, the flow regulator comprising a flow-attenuating labyrinth formed at least in part by a plurality of baffles, at least one of said baffles being implemented as a leaf-spring deployed so as to be free to flex in response to variations in a pressure exerted on said leaf-spring by the fluid.

9. The flow regulator of claim 8, wherein at least two of said baffles are implemented as leaf-springs, each of said leaf-springs being free to flex substantially independently of others of said leaf springs.

10. The flow regulator of claim 8, wherein said at least one leaf spring is formed from metallic material.

11. A flow regulator for regulating flow of a fluid, the flow regulator comprising a flow-attenuating labyrinth configured to define a series of at least two indirect flow path legs, wherein said at least two flow path legs are each configured to provide a pressure-responsive variable flow path geometry wherein a cross-sectional area of at least part of said flow path leg varies as a function of the pressure of the fluid entering said flow path leg such that, at least within a first range of values of said pressures said cross-sectional area decreases in response to an increase in said pressure.

12. The flow regulator of claim 11, wherein each of said at least two flow path legs passes around an edge of a sheet-like metallic element.

13. The flow regulator of claim 11, wherein each of said at least two flow path legs includes a leaf-spring portion configured to be deflected by pressure of the fluid in a manner such as to provide said pressure-responsive variable flow path geometry.

14. A method for regulating a rate of flow of a fluid, the method comprising providing a flow-attenuating labyrinth configured to define a series of at least two indirect flow path legs, wherein said at least two flow path legs are each configured to provide a pressure-responsive variable flow path geometry wherein a cross-sectional area of at least part of said flow path leg varies as a function of the pressure of the fluid entering said flow path leg such that, at least with a first range of values of said pressure, said cross-sectional area decreases in response to an increase in said pressure.

15. The method of claim 14, wherein each of said at least two flow path legs passes around an edge of a sheet-like metallic element.

16. The method of claim 14, wherein each of said at least two flow path legs includes a leaf-spring portion configured to be deflected by pressure of the fluid in a manner such as to provide said pressure-responsive variable flow path geometry.

* * * * *